United States Patent
Nicklass

(10) Patent No.: US 7,472,617 B2
(45) Date of Patent: Jan. 6, 2009

(54) STEP-BY-STEP VARIABLE TRANSMISSION

(75) Inventor: Oliver Nicklass, Kronau (DE)

(73) Assignee: Getrag Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/775,178

(22) Filed: Jul. 9, 2007

(65) Prior Publication Data

US 2008/0006109 A1 Jan. 10, 2008

Related U.S. Application Data

(63) Continuation of application No. PCT/EP2005/013378, filed on Dec. 13, 2005.

(30) Foreign Application Priority Data

Jan. 27, 2005 (DE) ........................ 10 2005 005 338

(51) Int. Cl.
*F16H 3/24* (2006.01)
(52) U.S. Cl. .......................... 74/340; 74/331
(58) Field of Classification Search ................... 74/331, 74/340
See application file for complete search history.

(56) References Cited

U.S. PATENT DOCUMENTS

| | | | | |
|---|---|---|---|---|
| 3,667,309 A | * | 6/1972 | Franz et al. | .................... 74/340 |
| 4,271,715 A | | 6/1981 | Arai | |
| 4,957,016 A | * | 9/1990 | Amedei et al. | ............ 74/336 R |
| 5,014,567 A | | 5/1991 | Horiuchi et al. | |
| 5,881,600 A | | 3/1999 | Fan | |
| 6,460,425 B1 | * | 10/2002 | Bowen | ........................ 74/331 |
| 6,722,217 B2 | | 4/2004 | Wafzig | |
| 7,040,186 B2 | * | 5/2006 | Pollak | .......................... 74/330 |

FOREIGN PATENT DOCUMENTS

| | | |
|---|---|---|
| DE | 39 32 264 | 12/1997 |
| DE | 101 37 356 | 2/2003 |
| EP | 1 031 765 | 8/2000 |
| EP | 0 798 491 | 9/2001 |
| GB | 2 113 322 | 8/1983 |
| JP | 02275148 | 11/1990 |
| JP | 05133443 A | * 5/1993 |
| JP | 10103427 | 4/1998 |

OTHER PUBLICATIONS

International Search Report for PCT/EP2005/013378, Aug. 9, 2007, pp. 1-6.

* cited by examiner

*Primary Examiner*—Ha D. Ho
(74) *Attorney, Agent, or Firm*—Knobbe, Martens, Olson & Bear, LLP

(57) ABSTRACT

A step-by-step variable transmission has a housing, a drive input shaft device, a drive output shaft and a countershaft. A plurality of gearwheel sets are mounted on the drive input shaft and on the countershaft. The gearwheel sets can be shifted so as to establish different gear stages by means of respective shift clutches. The countershaft is connected to the drive output shaft by means of a drive output constant wheel set. The drive output shaft is rotatably mounted in the region of its opposite ends on the housing by means of two bearings. At least one of the gearwheel sets is mounted in the region in the axial direction between the two bearings of the drive output shaft.

14 Claims, 3 Drawing Sheets

STEP-BY-STEP VARIABLE TRANSMISSION

CROSS-REFERENCE TO RELATED APPLICATIONS

This is a Continuation application of International patent application PCT/2005/013378, filed Dec. 12, 2005, which claims the priority of German patent application DE 10 2005 005 338, filed Jan. 27, 2005.

BACKGROUND OF THE INVENTION

The present invention relates to a step-by-step variable transmission, in particular for motor vehicles, having a housing, having a drive input shaft device, having a drive output shaft and having a countershaft, with a plurality of gearwheel sets being mounted on the drive input shaft and on the countershaft, with it being possible for the gearwheel sets to be shifted so as to establish different gear stages by means of respective shift clutches, with the countershaft being connected to the drive output shaft by means of a drive output constant gearwheel set, and with the drive output shaft being rotatably mounted in the region of its opposite ends on the housing by means of two bearings.

A step-by-step variable transmission of said type is known from EP 1 031 765 A2. Said known transmission is a so-called in-line transmission, that is to say a transmission for longitudinal installation in the motor vehicle.

Conventional in-line transmissions of said type generally have a drive input constant gearwheel set. A drive input constant gearwheel set of said type usually comprises, at the input of the transmission, a fixed gearwheel which is fixedly connected to the drive input shaft and a fixed gearwheel which is fixedly connected to the countershaft. In the case of dual clutch transmissions, a separate drive input constant gearwheel set is usually provided for each drive input shaft.

A drive input constant gearwheel set of said type establishes a ratio for the transmission-input-side torque (generally the torque of an engine of the motor vehicle such as an internal combustion engine) directly to the transmission input. This leads to a comparatively high torque loading at the countershaft.

This has the result that the toothings of the gearwheel sets for the different gear stages must be designed to be relatively wide in order to withstand the high torques. The shift clutches must also be designed for the comparatively high torques, in particular when the shift clutches are, as is conventional, so-called synchronous clutches.

In contrast, EP 1 031 765 A2 as cited in the introduction relates to an in-line transmission with a drive output constant gearwheel set. In such a transmission type, a constant gearwheel set is seated in the region of the transmission output or in the region of the drive output shaft. As a result of this measure, the torque loading at the countershaft is reduced. However, the rotational speed level in the region of the countershaft is increased in relation to solutions with a drive input constant.

As a result of the relatively low torque loadings, it is possible for the toothings of the gearwheel sets to be of narrower design than in the case of solutions with a drive input constant. The transmission can therefore generally be of shorter design in the axial direction. Only the drive output constant gearwheel set must be of considerably wider design than in the case of step-by-step variable transmissions with a drive input constant gearwheel set. The loading of the shift clutches (synchronizations) is also reduced. It is hereby also possible to obtain shorter shift times.

One problem of step-by-step variable transmissions with a drive output constant gearwheel set is that it is comparatively difficult to mount the drive output constant gearwheel set in such a stiff manner that it still has an acceptable contact pattern despite its comparatively large width. Although the drive output shaft can generally be of short design from conception, for said reason, it is nevertheless usually mounted so as to project far back, as is described for example in EP 1 031 765 A2.

The conceptually obtainable installation length advantage of the transmission type is therefore relinquished again.

DE 39 32 264 C2 discloses a further step-by-step variable transmission with a drive output constant. The transmission is embodied as a 5-gear transmission, with the fourth gear being designed as a direct gear in which the drive input shaft is connected directly to the drive output shaft. In addition, the drive input shaft is mounted in the drive output shaft. Here, too, the drive output shaft projects relatively far out in the axial direction.

A further transmission concept with a drive output constant is known from EP 0 798 491 B1. This is a 6-gear transmission in which the fourth gear stage is embodied as a direct gear stage. The drive input shaft is again mounted in the drive output shaft. A complex mounting of the drive output shaft is provided in this embodiment also.

BRIEF SUMMARY OF THE INVENTION

Against the above background, it is the object of the invention to specify an improved step-by-step variable transmission, in particular a step-by-step variable transmission with a drive output constant and short installation length.

Said object is achieved in the step-by-step variable transmission specified in the introduction in that at least one of the gearwheel sets is mounted in the region in the axial direction between the two bearings of the drive output shaft.

This measure results in the drive output shaft being mounted with a favourable contact pattern. It is therefore also possible to obtain very stiff mounting of the drive output constant gearwheel set, in particular substantially without installation length disadvantages. There is generally also a resulting considerably more favourable bearing loading. Here, the bearings can be arranged further away from the drive output constant gearwheel set.

The object is therefore achieved in its entirety.

It is particularly advantageous if the drive output shaft is mounted in the region of its one end in a hollow section of the drive input shaft device.

This leads overall to favourable relative mounting between the shafts of the step-by-step variable transmission.

Here, it is particularly advantageous if one gearwheel of the gearwheel set which is mounted between the bearings is mounted externally on the hollow section of the drive input shaft device.

In this embodiment, the gearwheel set which is mounted between the bearings is mounted loose on the hollow section. It is thereby possible overall for the support width of the mounting of the drive output shaft to be increased in a simple way.

According to a further preferred embodiment, a shift clutch for shifting the gearwheel set mounted between the bearings is likewise mounted between the bearings, in particular on the hollow section.

The support width of the drive output shaft can hereby be further increased.

A further preferred embodiment provides that a fixed gearwheel of the drive output constant gearwheel set is fastened to the drive output shaft in the axial direction between the two bearings.

This has the overall result that both the drive output constant gearwheel set and also the at least one gearwheel set for establishing a respective gear stage are mounted between the two bearings of the drive output shaft. This leads overall to a very large support width. The bearing loading is therefore reduced, but it is possible to obtain sufficiently stiff mounting of the drive output constant gearwheel set.

Here, according to a further preferred embodiment, a direct shift clutch is provided in order to connect the drive input shaft device directly to the drive output shaft.

In this way, a direct gear is established, so that a further installation length reduction can be obtained overall, because a gear stage gearwheel set is spared for the direct gear.

It is particularly advantageous here if the direct shift clutch and the shift clutch for shifting the gearwheel set which is mounted between the bearings are integrated in one shift clutch pack.

This leads to a further shortening of the installation length of the step-by-step variable transmission.

According to a first alternative embodiment, the drive input shaft device is formed by a single drive input shaft.

In this embodiment, the step-by-step variable transmission can be embodied as a manual shift transmission (MT) or as an automated manual shift transmission (AMT).

In a second alternative embodiment, the drive input shaft device has a first drive input shaft and a second drive input shaft which is coaxial with respect to said first drive input shaft and is embodied as a hollow shaft, which drive input shafts can be connected to a dual clutch arrangement.

In the second alternative embodiment, the step-by-step variable transmission is consequently embodied as a dual clutch transmission (DCT).

It is self-evident here that any hollow section provided for holding the drive output shaft is provided only on one of the two drive input shafts, in particular on the first drive input shaft.

In the design of the step-by-step variable transmission as a dual clutch transmission, it is particularly advantageous if the first shaft projects beyond the second shaft in the axial direction and if the second shaft is not mounted on the housing in the exit region of the first shaft.

This generally results in the two drive input shafts being mounted on one another. It is hereby possible overall to save a housing wall which is otherwise necessary in the exit region. It is self-evident that a bearing of said type for mounting the second drive input shaft on the first drive input shaft is to be arranged in particular in the exit region.

In an alternative embodiment of the step-by-step variable transmission according to the invention, the drive output shaft has, in the region of its one end, a hollow section in which one end of the drive input shaft device is mounted.

It is also possible in this embodiment for a gearwheel set for establishing a gear stage to be arranged between the bearings of the drive output shaft. Here, the gearwheel set arranged between the two bearings can for example also be designed as an "overdrive gearwheel set" which is arranged between the two bearings in the manner of a second drive output constant gearwheel set. Here, it is self-evident that generally both the first and the second drive output constant gearwheel sets can then be shifted.

It is also advantageous overall if the drive input shaft device is rotatably mounted in the region of its ends on the housing by means of two bearings.

Here, in the embodiment according to the invention, it is generally sufficient to provide two bearings for mounting the drive input shaft device. In other words, a third bearing is generally not necessary, even for 5, 6 or 7 gear stages.

According to a further embodiment which is preferable overall, the drive input shaft devices and the drive output shaft are mounted on the housing by means of a total of three bearings.

In this embodiment, it is for example possible to provide only one intermediate wall between a transmission-input-side housing wall and a transmission-output-side housing wall.

It is also advantageous overall if the drive input shaft device and the drive output shaft are aligned coaxially with respect to one another.

Although a parallel alignment is generally also conceivable, it is self-evident that a coaxial alignment results in particular when the drive input shaft device and the drive output shaft are mounted one inside the other.

Overall, at least one of the following advantages is achieved with the step-by-step variable transmission according to the invention in the various embodiments:

a resulting short installation length of the overall transmission;

a resulting low torque loading of the toothings of the gearwheel sets, as a result of which it is possible if appropriate to use in particular more cost-effective materials and finishing processes. There can in particular be a larger resulting selection of heat treatment processes for the individual gearwheels and other transmission components;

resulting lower inertias, as a result of which it is possible to realize short shift times and/or smaller-dimensioned shift clutches or synchronous clutches.

It is self-evident that the features specified above and the features yet to be explained below can be used not only in the respectively specified combination but also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
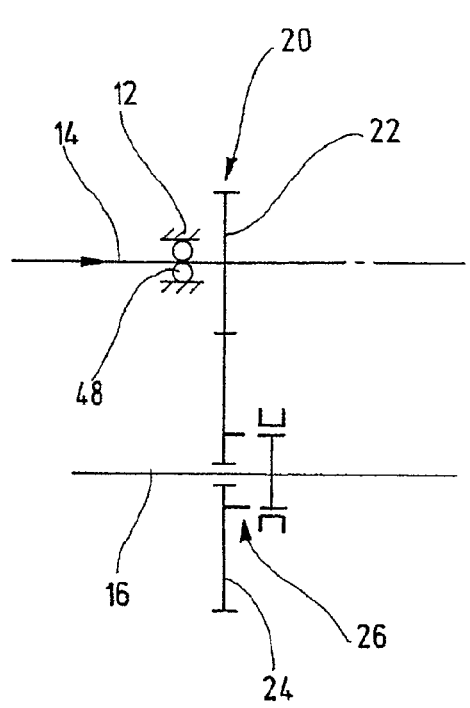
FIG. 1 is a schematically simplified illustration of a first embodiment of the step-by-step variable transmission according to the invention, in particular in the form of a manual shift transmission MT or automated manual shift transmission AMT.
Figure 1:
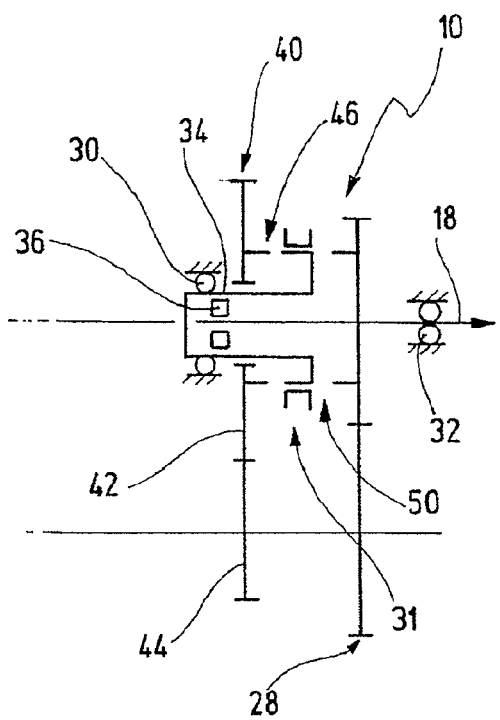

In FIG. 1, a first embodiment of the step-by-step variable transmission according to the invention is denoted overall by 10.

The step-by-step variable transmission 10 is designed as an in-line transmission, that is to say as a transmission for longitudinal installation in a motor vehicle, in particular a passenger vehicle.

The step-by-step variable transmission 10 has a housing 12 which is generally designed as a multi-part housing. For the purposes of a simplified illustration, the housing 12 in the illustration of FIG. 1—and in the following illustrations—is illustrated in an undivided state. The housing 12 can be a housing which serves merely to hold functionally essential parts of the step-by-step variable transmission. The housing 12 can however also be formed as part of adjacent housings and for example comprise a partition between the gearwheel sets of the step-by-step variable transmission 10 and/or to an input-side starting and separating clutch or the like.

The step-by-step variable transmission 10 also has a drive input shaft device in the form of a single drive input shaft 14 which can for example be connected to the output member of a starting and separating clutch.

Provided parallel to the drive input shaft 14 is a countershaft 16. A drive output shaft 18 is aligned coaxially with respect to the drive input shaft 14.

The step-by-step variable transmission 10 has a plurality of gearwheel sets for establishing different gear stages, one of which gearwheel sets in the region of the transmission input is illustrated by way of example at 20. The gearwheel set 20 has a fixed gearwheel 22, which is connected to the drive input shaft 14, and a loose gearwheel or gear gearwheel 24 which is rotatably mounted on the countershaft 16.

A first shift clutch 26, for example in the form of a synchronous clutch, is provided in order to shift the gear stage assigned to the gearwheel set 20, that is to say in order to engage and disengage the associated gear.

The step-by-step variable transmission 10 also has a drive output constant gearwheel set 28 in the region of the transmission output. The drive output constant gearwheel set 28 has two fixed gearwheels, one of which is connected to the countershaft 16 and one of which is connected to the drive output shaft 18.

The drive output shaft 18 is rotatably mounted on the housing 12 by means of a first drive output shaft bearing 30 and a second drive output shaft bearing 32.

More precisely, that end of the drive input shaft 14 which points toward the drive output shaft 18 has a hollow section 34 (which can be provided for example as a bore or the like), and one end of the drive output shaft 18 is mounted in the hollow section 34 drive input shaft 14 by means of a bearing, in particular a needle bearing 36. The hollow section 34 is in turn rotatably mounted at its outer periphery on the housing by means of the first drive output shaft bearing 30.

The hollow section 34 extends, in the region between the two drive output shaft bearings 30, 32, approximately up to the drive output constant gearwheel set 28.

The hollow section 34 projects beyond the first drive output shaft bearing 30 in the direction of the second drive output shaft bearing 32.

Mounted between the two drive output shaft bearings 30, 32 is a further gearwheel set 40 for establishing a further gear stage. More precisely, the second gearwheel set 40 has a loose gearwheel 42, which is rotatably mounted on the projecting section of the hollow section 34, and also has a fixed gearwheel 44 which is connected to the countershaft 16.

Also mounted on the projecting section of the hollow section 34 is a second shift clutch 46 which serves for shifting the gearwheel set 40.

More precisely, the second shift clutch 46 is arranged between the second gearwheel set 40 and the drive output constant gearwheel set 28. In this way, the second gearwheel set 40 can be mounted relatively close to the first drive output shaft bearing 30.

In the step-by-step variable transmission 10, a direct gear (the possibility of a direct connection between the drive input shaft 14 and the drive output shaft 18) can be provided, as is shown. In this case, a shift clutch 50 for the direct gear and the shift clutch 46 can be integrated in one pack 51.

It is self-evident that the loose gearwheels of the gearwheel sets 20, 40 can be arranged either on the drive input shaft 14 or on the countershaft 16. The arrangement of the loose gearwheel 24 on the countershaft 16 or of the loose gearwheel of the gearwheel set 40 on the drive input shaft 14 is merely to be understood as an example.

As a result of the measure of likewise arranging one of the "normal" gearwheel sets for establishing a respective gear stage between the two bearings 30, 32 of the drive output shaft 18, it is possible to increase the spacing between the two bearings 30, 32. This results in a greater support width for the mounting of the drive output shaft 18. The bearing loading is reduced. It is however also possible to obtain comparatively stiff mounting of the drive output constant gearwheel set 28 which transmits comparatively high torques because, while in-line transmissions from the prior art have relatively large support widths between the mountings, the transmission according to the invention has a sufficiently shortened or optimized support width.

It is also possible overall to obtain a short installation length of the step-by-step variable transmission 10 since it is not necessary to arrange the second bearing 32 at a great distance in the axial direction from the drive output constant gearwheel set 28.

As a result of the measure of mounting the drive input shaft 14 and the drive output shaft 18 one inside the other, the two shafts can be mounted on the housing 12 in said region by means of a single bearing 30. Accordingly, only one intermediate wall of the housing 12 is preferred between a transmission-input-side housing wall and a transmission-output-side housing wall.

In the region of the transmission input, the drive input shaft 14 is mounted on the housing 12 by means of a first drive input shaft bearing 48.

Only three bearings are therefore provided overall for mounting the drive input shaft 14 and the drive output shaft 18, specifically the bearings 48, 30, 32 in said sequence as viewed proceeding from the transmission input.

Figure 2:
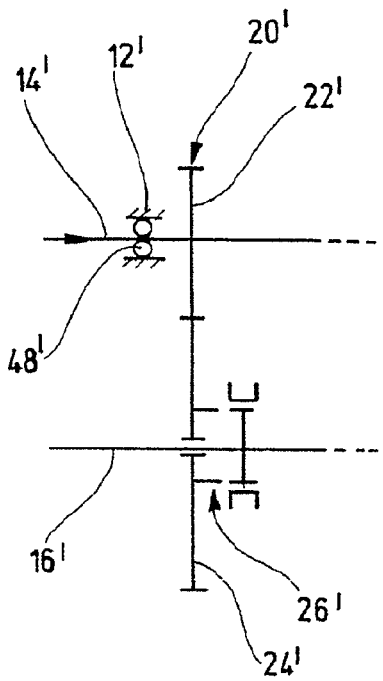
FIG. 2 shows a further embodiment of the step-by-step variable transmission according to the invention, in particular in the form of a manual shift transmission MT or automated manual shift transmission AMT.
Figure 2:
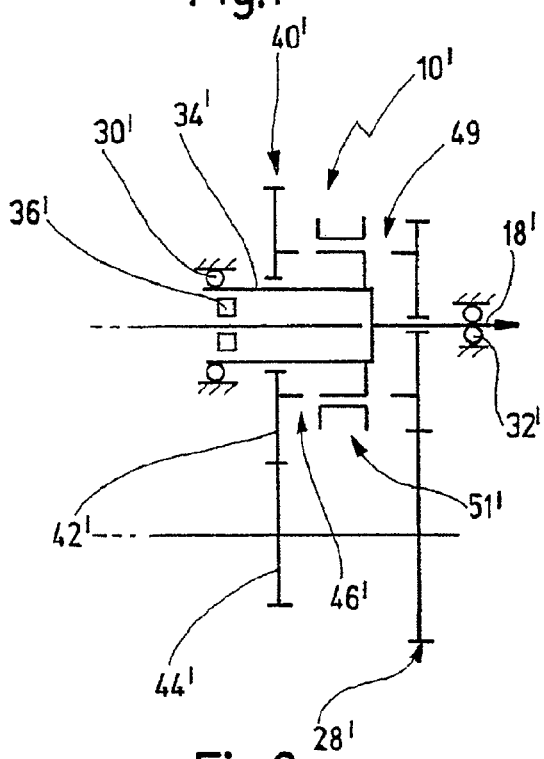

In FIG. 2, a further embodiment of the step-by-step variable transmission according to the invention is denoted generally by 10'.

The step-by-step variable transmission 10' corresponds generally in terms of design and function to the step-by-step variable transmission 10 of FIG. 1. Only the differences are therefore discussed in the following.

While a drive output constant gearwheel set 28 is provided in the step-by-step variable transmission 10, the step-by-step variable transmission 10' has two drive output constant gearwheel sets 28', 40' which can be alternately shifted by means of one shift clutch pack 51.

The shift clutch pack 51 has a second shift clutch 46' and a third shift clutch 49.

The drive input shaft 14' is mounted in the hollow section 34' of the drive output shaft 18', specifically by means of a needle bearing 36'. The hollow section 34' is itself mounted on the housing 12' by means of the bearing 30'.

It is therefore also the case in the step-by-step variable transmission 10' that two gearwheel sets 40', 28' are mounted between the two bearings 30', 32' of the drive output shaft 18', so that a comparatively large spacing of the two bearings 30', 32' can be realized without an increase in installation length.

The two gearwheel sets 40', 28' can be embodied in the manner of a standard drive output constant gearwheel set and of an overdrive drive output constant gearwheel set.

Figure 3:
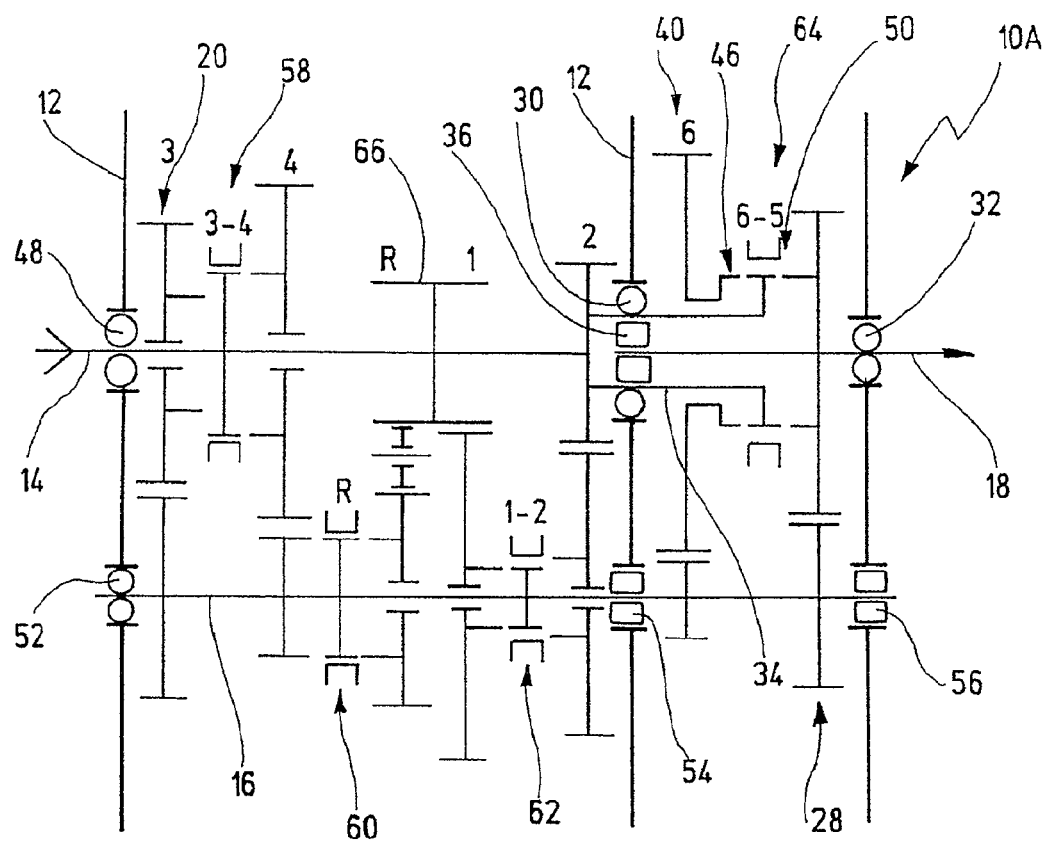
FIG. 3 is a schematic illustration of a further embodiment of the step-by-step variable transmission according to the invention, with the gearwheel set design being particularly suitable for a manual shift transmission MT.

In FIG. 3, a further embodiment of the step-by-step variable transmission according to the invention is denoted generally by 10A.

The step-by-step variable transmission 10A corresponds generally in terms of design and function to the step-by-step variable transmission 10 of FIG. 1. Only the differences are therefore discussed in the following.

The step-by-step variable transmission 10A is embodied as a 6-gear manual shift transmission (MT).

The housing 12 of the transmission 10A has a transmission-input-side wall on which are arranged the first drive input shaft bearing 48 and a first bearing 52 for the countershaft 16.

The housing 12 also has a transmission-output-side housing wall on which are arranged the second drive output shaft bearing 32 and a bearing 56 for the countershaft 16.

Arranged on an intermediate wall of the housing 12 are the first drive output shaft bearing 30 and a further bearing 54 for the countershaft 16.

Arranged between the transmission-input-side housing wall and the intermediate wall are gearwheel sets for the following gear stages, in this sequence proceeding from the transmission input: gear stage 3 and gear stage 4, with an interposed shift clutch pack 58, gear stage R with shift clutch pack 60, gear stages 1 and 2 with interposed shift clutch pack 62.

Mounted on the hollow section 34 of the drive input shaft 14 is a gearwheel set 40 for the sixth gear and a fourth shift clutch pack 64. The fourth shift clutch pack 64 contains the shift clutch 46 for shifting the gearwheel set 40 and a direct shift clutch 50 for directly connecting the drive input shaft 14 and the drive output shaft 18, whereby the fifth gear stage is established in the step-by-step variable transmission 10A.

The step-by-step variable transmission 10A is also designed in terms of the gearwheel sets such that a common fixed gearwheel 66 (conventionally having one or else having two toothings) for the reverse gear and the first gear stage is fixed to the drive input shaft 14.

Figure 4:
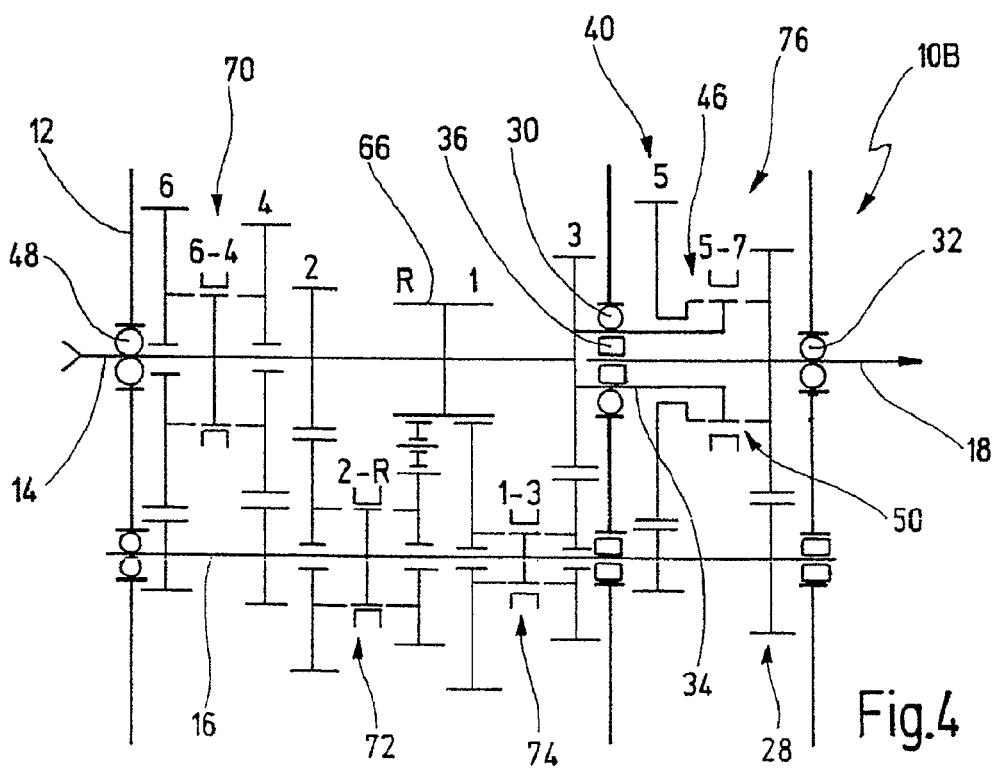
FIG. 4 is a schematic illustration of a further embodiment of the step-by-step variable transmission according to the invention, with the gearwheel set design being designed in particular for an automated manual shift transmission AMT.

In FIG. 4, a schematic illustration of a further embodiment of the step-by-step variable transmission according to the invention is denoted generally by 10B.

The step-by-step variable transmission 10B corresponds in terms of design and function to the step-by-step variable transmission 10 of FIG. 1. Only the differences are discussed in the following.

The step-by-step variable transmission 10B is designed, in terms of the gearwheel set design, as an automated manual shift transmission (AMT) having 7gear stages.

This means in particular that it is not necessary to assign one shift clutch pack to adjacent gear stages. Moreover, it is even expedient in some cases, in order to obtain overlapping operation between disengaging the source gear stage and engaging a target gear stage to assign adjacent gear stages to different shift clutch packs.

Accordingly, in the step-by-step variable transmission 10B, the following gearwheel set design is provided between the transmission-input-side housing wall and the intermediate wall of the housing 12, specifically in this order as viewed proceeding from the transmission input: gearwheel set for the gear stage 6 and gearwheel set for the gear stage 4, with an interposed shift clutch pack 70, gearwheel set for the gear stage 2 and the reverse gear, with an interposed second shift clutch pack 72, gearwheel set for the gear stage 1 and gearwheel set for the gear stage 3, with an interposed third shift clutch pack 74.

In the step-by-step variable transmission 10B, a gearwheel set 40 for the gear stage 5 and an associated shift clutch 46 and also a direct shift clutch 50 for establishing a direct gear are arranged between the two bearings 30, 32, with the direct gear stage in the present case being the gear stage 7. The shift clutches 46, 50 are integrated in one shift clutch pack 76.

Figure 5:
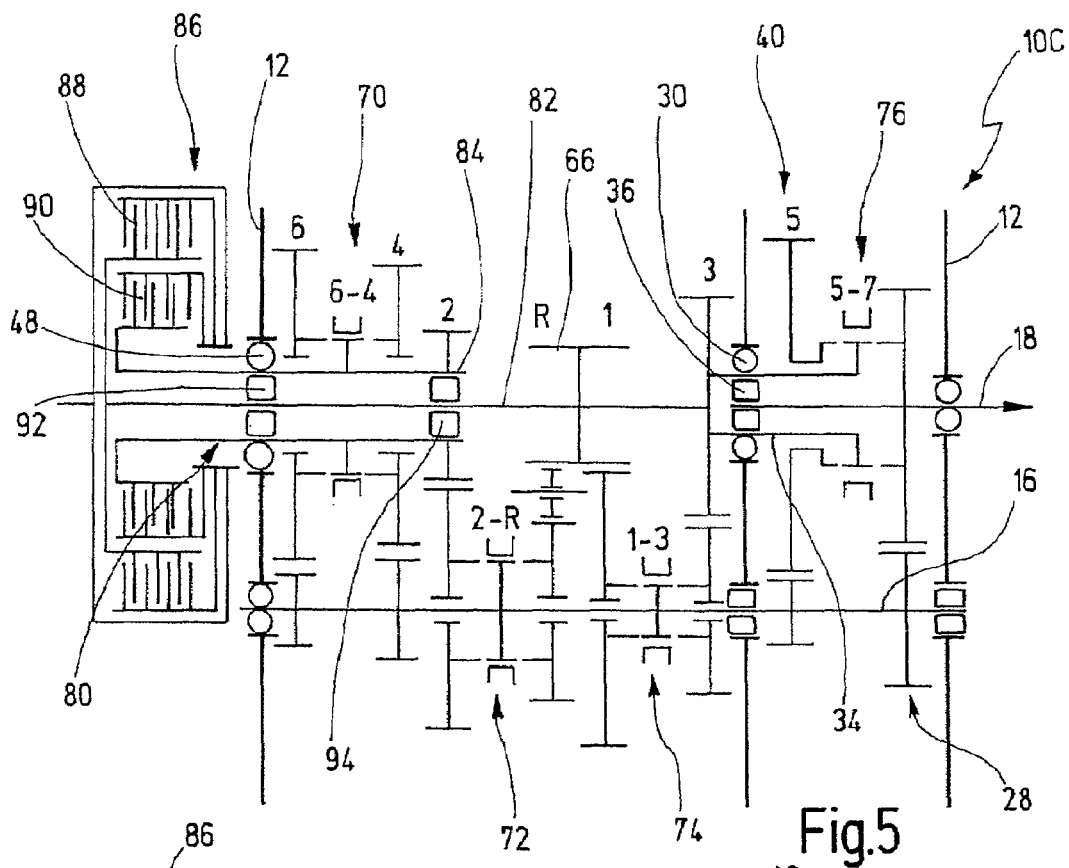
FIG. 5 is a schematic illustration of a further embodiment of the step-by-step variable transmission according to the invention which is embodied as a dual clutch transmission DCT.
Figure 6:
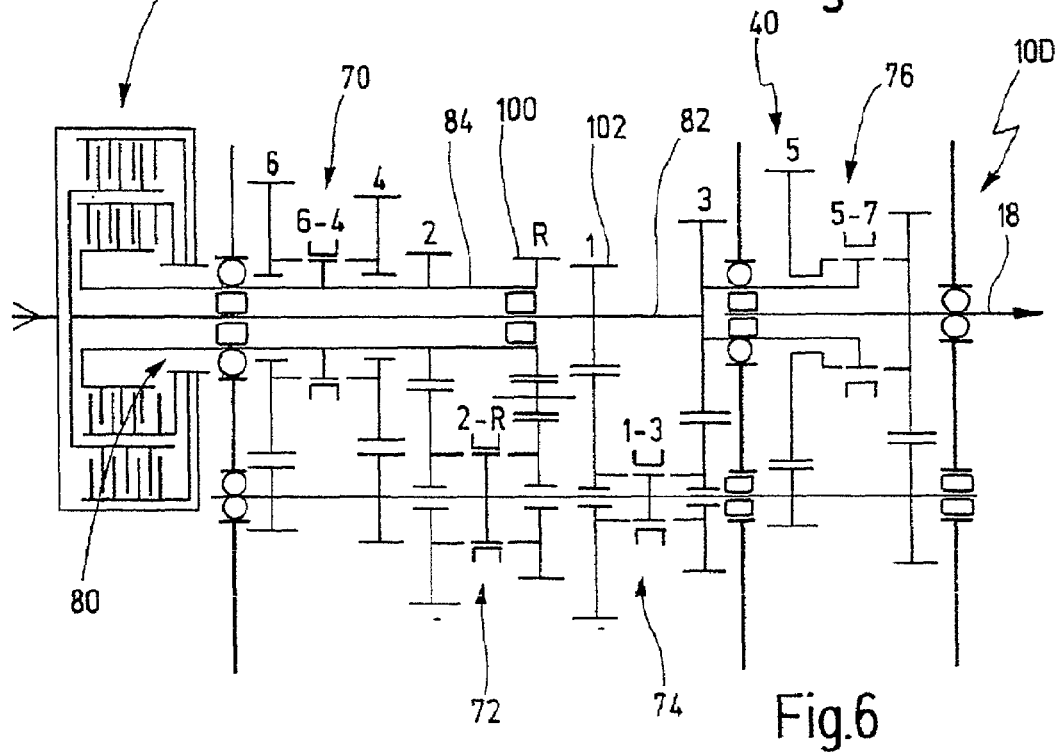
FIG. 6 is a schematic illustration of a further embodiment of the step-by-step variable transmission according to the invention which is designed as a dual clutch transmission DCT.

In FIGS. 5 and 6, schematic illustrations of further embodiments of the step-by-step variable transmission according to the invention are denoted generally by 10C and 10D.

The step-by-step variable transmissions 10C, 10D correspond generally in terms of design and function in particular with regard to the gearwheel set sequence, to the step-by-step variable transmission 10B, but with the step-by-step variable transmissions 10C, 10D being embodied as dual clutch transmissions.

The following description of the differences to the step-by-step variable transmission 10B relates both to the step-by-step variable transmission 10C and to the step-by-step variable transmission 10D.

The two step-by-step variable transmissions 10C, 10D have, as a drive input shaft device 80, a first drive input shaft 82 and a second drive input shaft 84 which is coaxial with respect to said first drive input shaft 82 and is embodied as a hollow shaft. The two drive input shafts 82, 84 are set up to be connected to a transmission-input-side dual clutch arrangement 86. More precisely, the first drive input shaft 82 can be connected to a first clutch 88 of the dual clutch arrangement 86. The second drive input shaft 84 can be connected to a second clutch 90 of the dual clutch arrangement 86.

The drive input shafts 82, 84 are mounted on one another, specifically by means of a first needle bearing 92 and a second needle bearing 94. The second drive input shaft 84 is mounted on the housing 12 by means of the transmission-input-side first drive input shaft bearing 48. The first needle bearing 92 is aligned approximately with the first drive input shaft bearing 48. The second needle bearing 94 is arranged approximately in the exit region of the first drive input shaft 82 out of the shorter second drive input shaft 84.

The gearwheel sets for the gear stages 6, 4 and 2 are assigned to the second drive input shaft 84. The gearwheel sets R, 1, 3, 5 are assigned to the first drive input shaft 84.

The function of a dual clutch transmission, in particular the fact that the even gear stages are assigned to the one drive input shaft and the odd gear stages are assigned to the other drive input shaft in order to thereby carry out an overlapping actuation of the input-side clutches 88, 90 and therefore gear changes without an interruption in tractive force, is assumed to be known.

The step-by-step variable transmission 10D differs from the step-by-step variable transmission 10C merely in that the gear stage R for the reverse gear is assigned not to the first drive input shaft 82 but rather to the second drive input shaft

84. Accordingly, for the reverse gear stage R, a separate fixed gearwheel 100 is fixed to the second drive input shaft 84. For the gear stage 1, a separate fixed gearwheel 102 is fixed to the first drive input shaft 82.

What is claimed, is

1. A step-by-step variable transmission having a housing, having a drive input shaft device, having a drive output shaft device and having a countershaft, with a plurality of gearwheel sets being mounted on the drive input shaft device and on the countershaft, with it being possible for the gearwheel sets to be shifted so as to establish different gear stages by means of respective shift clutches, with the countershaft being connected to the drive output shaft device by means of a drive output constant wheel set, and with the drive output shaft device being rotatably mounted in the region of its opposite ends on the housing by means of two bearings, wherein at least one of the gearwheel sets is mounted on the drive input shaft device in the region in the axial direction between the two bearings of the drive output shaft device.

2. The step-by-step variable transmission as claimed in claim 1, wherein the drive output shaft device is mounted in the region of its one end in a hollow section of the drive input shaft device.

3. The step-by-step variable transmission as claimed in claim 2, wherein one gearwheel of the gearwheel sets which is mounted between the bearings is mounted externally on the hollow section.

4. The step-by-step variable transmission as claimed in claim 1, wherein a shift clutch for shifting the at least one gearwheel set is likewise mounted between the bearings.

5. The step-by-step variable transmission as claimed in claim 1, wherein a fixed gearwheel of the drive output constant wheel set is fastened to the drive output shaft device in the axial direction between the two bearings.

6. The step-by-step variable transmission as claimed in claim 5, wherein a direct shift clutch is provided in order to connect the drive input shaft device directly to the drive output shaft device.

7. The step-by-step variable transmission as claimed in claim 6, wherein the direct shift clutch and a shift clutch for shifting the at least one gearwheel set which is mounted on the drive input shaft device and between the bearings of the drive output shaft device are integrated in one shift clutch pack.

8. The step-by-step variable transmission as claimed in claim 1, wherein the drive input shaft device is formed by a single drive input shaft.

9. The step-by-step variable transmission as claimed in claim 1, wherein in that the drive input shaft device has a first drive input shaft and a second drive input shaft which is coaxial with respect to said first drive input shaft and is embodied as a hollow shaft, the first and second drive input shafts can be connected to a dual clutch arrangement.

10. The step-by-step variable transmission as claimed in claim 9, wherein the first drive input shaft projects beyond the second drive input shaft in the axial direction and wherein the second drive input shaft is not mounted on the housing in an exit region of the first drive input shaft.

11. The step-by-step variable transmission as claimed in claim 1, wherein the drive output shaft has, in the region of its one end, a hollow section in which one end of the drive input shaft device is mounted.

12. The step-by-step variable transmission as claimed in claim 1, wherein the drive input shaft device is rotatably mounted in the region of its ends on the housing by means of two bearings.

13. The step-by-step variable transmission as claimed in claim 1, wherein only three bearings are provided for mounting the drive input shaft device and the drive output shaft device.

14. The step-by-step variable transmission as claimed in claim 1, wherein the drive input shaft device and the drive output shaft are aligned coaxially with respect to one another.

* * * * *